(12) United States Patent
Kohler et al.

(10) Patent No.: US 10,579,947 B2
(45) Date of Patent: Mar. 3, 2020

(54) SYSTEM AND METHOD FOR SCHEDULING BASED ON SERVICE COMPLETION OBJECTIVES

(75) Inventors: Joylee E. Kohler, Northglenn, CO (US); Andrew D. Flockhart, Westminster, CO (US); Robert C. Steiner, Westminster, CO (US)

(73) Assignee: Avaya Inc., Basking Ridge, NJ (US)

(*) Notice: Subject to any disclaimer, the term of this patent is extended or adjusted under 35 U.S.C. 154(b) by 204 days.

(21) Appl. No.: 13/179,245

(22) Filed: Jul. 8, 2011

(65) Prior Publication Data

US 2013/0013359 A1 Jan. 10, 2013

(51) Int. Cl.
*G06Q 10/06* (2012.01)
*G06Q 30/00* (2012.01)

(52) U.S. Cl.
CPC ... *G06Q 10/06311* (2013.01); *G06Q 10/0631* (2013.01); *G06Q 30/01* (2013.01)

(58) Field of Classification Search
CPC ......... G06Q 10/06311; G06Q 10/0631; G06Q 30/01; G06Q 30/00
USPC .............................. 705/7.11, 7.12, 300, 304
See application file for complete search history.

(56) References Cited

U.S. PATENT DOCUMENTS

| | | | |
|---|---|---|---|
| 5,724,419 A * | 3/1998 | Harbuziuk et al. | 379/266.04 |
| 5,867,572 A * | 2/1999 | MacDonald et al. | 379/266.06 |
| 5,903,641 A * | 5/1999 | Tonisson | H04M 3/5233 |
| | | | 379/265.12 |
| 5,911,134 A * | 6/1999 | Castonguay | G06Q 10/06 |
| | | | 379/112.01 |
| 6,366,666 B2 * | 4/2002 | Bengtson et al. | 379/265.06 |
| 6,463,346 B1 * | 10/2002 | Flockhart | G06Q 10/10 |
| | | | 379/266.01 |
| 6,639,982 B1 * | 10/2003 | Stuart | H04M 3/51 |
| | | | 379/265.01 |
| 6,741,698 B1 * | 5/2004 | Jensen | 379/265.02 |
| 8,136,114 B1 * | 3/2012 | Gailloux et al. | 718/104 |
| 8,270,591 B2 * | 9/2012 | Lawrence et al. | 379/265.03 |
| 8,326,667 B2 * | 12/2012 | Johnson | 705/7.13 |
| 8,811,597 B1 * | 8/2014 | Hackbarth | G06Q 10/06395 |
| | | | 379/265.02 |
| 2003/0156704 A1 * | 8/2003 | Dezonno et al. | 379/265.1 |
| 2003/0198337 A1 * | 10/2003 | Lenard | G06Q 10/06 |
| | | | 379/265.14 |

(Continued)

OTHER PUBLICATIONS

Using simulation-based stochastic approximation to optimize staffing of systems with skills-based-routing, Proceedings of the 2010 Winter Simulation Conference B. Johansson, S. Jain, J. Montoya-Torres, J. Hugan, and E. Yucesan, eds., 978-1-4244-9865-9/10 © 2010 IEEE, pp. 3307-3317 (Year: 2010).*

(Continued)

*Primary Examiner* — Timothy Padot
*Assistant Examiner* — Darlene Garcia-Guerra (57) ABSTRACT

Provided herein is a system and method for determining a service agent start time objective for a customer contact and matching agents and customers based on meeting that objective. The method may include: receiving a customer contact to request service; determining a service completion objective for the customer contact based upon a service-level agreement; determining a handling time limit based on a historical elapsed handling time; and subtracting the handling time limit from the service completion objective, to produce the service agent start time.

16 Claims, 3 Drawing Sheets

(56) References Cited

U.S. PATENT DOCUMENTS

| | | | |
|---|---|---|---|
| 2004/0234066 A1* | 11/2004 | Beckstrom et al. | 379/266.07 |
| 2006/0080156 A1* | 4/2006 | Baughn | G06Q 10/06311 705/7.14 |
| 2006/0130042 A1* | 6/2006 | Dias | G06F 8/67 717/168 |
| 2006/0239440 A1* | 10/2006 | Shaffer et al. | 379/265.02 |
| 2006/0256953 A1* | 11/2006 | Pulaski et al. | 379/265.06 |
| 2006/0274758 A1* | 12/2006 | Busko et al. | 370/395.21 |
| 2007/0047695 A1* | 3/2007 | Tal | H04M 3/42195 379/67.1 |
| 2007/0219816 A1* | 9/2007 | Van Luchene | G06Q 10/06 705/80 |
| 2008/0056165 A1* | 3/2008 | Petrovykh | 370/270 |
| 2008/0077932 A1* | 3/2008 | Ruppach et al. | 718/105 |
| 2008/0196035 A1* | 8/2008 | Davoust et al. | 718/104 |
| 2008/0244597 A1* | 10/2008 | Calahan | H04M 3/367 718/104 |
| 2010/0088145 A1* | 4/2010 | Omiya | 705/9 |
| 2010/0111288 A1* | 5/2010 | Afzal et al. | 379/265.14 |
| 2010/0172488 A1* | 7/2010 | Segall et al. | 379/266.07 |
| 2011/0145032 A1* | 6/2011 | Stearns | 705/7.13 |
| 2011/0194684 A1* | 8/2011 | Ristock et al. | 379/265.02 |
| 2011/0246308 A1* | 10/2011 | Segall et al. | 705/14.66 |

OTHER PUBLICATIONS

European Search Report; EP Application No. 11195379.0; dated Mar. 13, 2013; European Patent Office; Munich Germany.

Communication pursuant to Article 94(3) EPC; EP Application No. 11195379.0; dated Jul. 15, 2016; European Patent Office; Munich Germany.

EPO: "Mitteilung des Europaischen Patentamts vom 1. Oct. 2007 uber Geschaftsmethoden = Notice from the European Patent Office dated Oct. 1, 2007 concerning business methods = Communique de l'Office europeen des brevets,en date du 1er Oct. 2007, concernant les methodes dans le domaine des activites," Journal Officiel De L'Office Europeen Des Brevets, Official Journal of the European Patent Office; Amtsblattt Des Europaeischen Patenta, Nov. 1, 2007 OEB; ISSN 0170-9291; vol. 30, Nr. 11, pp. 592-593; Munchen, Germany.

* cited by examiner

SYSTEM AND METHOD FOR SCHEDULING BASED ON SERVICE COMPLETION OBJECTIVES

BACKGROUND

Field of the Invention

Embodiments of the present invention generally relate to contact center agent service completion objectives and in particular to an improved system and method for substantially meeting service level agreements (SLAs) that specify a response time.

Description of Related Art

Call centers are commonly used by service providers or manufacturers (collectively, "vendors") to provide customer support. Customers requesting customer support may contact the call center by telephone. As additional methods of communication between agent and customer have been developed such as, but not limited to, e-mail, instant messaging, web chat, and so forth, call centers have evolved into contact centers in order to handle communication by a variety of methods, i.e., beyond telephone calls. An instance of a customer contacting a contact by any of these methods will be referred to herein as a customer contact. In contact centers, quickly finding and assigning a well-qualified service agent to service and fulfill a customer's need is important in providing improved customer satisfaction.

A service level agreement ("SLA") is often used to record a common understanding about services, priorities, responsibilities, guarantees, and warranties between a vendor and a customer. The SLA relates to the services the customer receives, and not how the service provider delivers that service. The SLA may specify the levels of availability, serviceability, performance, operation, or other attributes of the service, such as billing. The level of service can also be specified as both a target and a minimum, which allows customers to be informed to expect the minimum, while also informing the customer a target (e.g., average) value that shows the typical level of service performance. Monetary penalties may be imposed for non-compliance of the SLA.

Contact center routing algorithms are used to route the customer contact to a responsible agent. The routing algorithm may analyze the expected wait time, service objective, and percent in service level. The routing analysis is ordinarily directed to finding an agent and scheduling a time when the agent will begin working on a response to the contact. Contact center routing algorithms that affect routing performance metrics such as, but not limited to, expected wait time, service objective, and percent in service level, are typically based on when the agent begins working on a contact.

However, service level agreements for message-type media such as, but not limited to, email, are ordinarily based on when a response is returned to the customer (i.e., the service completion time), and not when an agent begins working on the response. Customers may not have accurate knowledge of how long it ordinarily takes for an agent to resolve a problem. Consequently, the customer may overestimate the time required to respond, and therefore submit a start-time objective that is earlier than necessary to resolve the problem. This may give the service agent more time than what is required to solve a problem, thereby encouraging inefficient practices. If the service agent has an overly generous deadline, the service agent may tend to work on a response over time and/or in fragmented blocks of time, leading to inefficient work and/or inaccurate accounting of the actual time needed to resolve a problem.

As described above, known scheduling processes suffer drawbacks that affect the speed and efficiency of resolving customer problems, causing more time than necessary to resolve a problem, and thus ultimately affecting customer satisfaction. Therefore, there exists a need for effectively scheduling a service agent start time for a given desired service completion objective.

SUMMARY

Embodiments of the present invention generally relate to a system and method for effectively scheduling a service agent start time for a desired service completion objective, and in particular to an improved system and method for substantially meeting a response time specified in a service level agreement (SLA).

In one embodiment, a method to schedule a service agent start time for a customer contact includes: receiving a customer contact to request service; determining a service completion objective for the customer contact based upon a service-level agreement; determining a handling time limit based on a historical elapsed handling time; and subtracting the handling time limit from the service completion objective, to produce the service agent start time.

In some embodiments, the service completion objective is further based upon a characteristic of the customer contact.

In some embodiments, the handling time limit includes a time indicated by a predetermined percentile of the historical elapsed handling time.

In some embodiments, the method further includes delivering the customer contact to the service agent within a predetermined time period before the service agent start time.

In some embodiments, the method further includes prohibiting a reschedule of the service agent start time by the service agent.

In some embodiments, the method further includes alerting the service agent of a service completion objective deadline within a predetermined time period before the deadline.

In some embodiments, determining a service completion objective for the customer contact further includes: storing into a database a pre-calculated service completion objective that is based upon one or more of contact type, identity of end-customer and repeat contact status; and retrieving from the database the pre-calculated service completion objective as the service completion objective.

In some embodiments, the predetermined time period depends upon a focus status of the customer contact.

In some embodiments, the method further includes suspending assignment of new service contacts to the service agent within a predetermined time period before a service completion objective deadline.

In some embodiments, the method further includes updating a database of historical elapsed handling times after the service agent has completed service.

In another embodiment of the present invention, a system to schedule a service agent start time for a customer contact includes: a communication channel configured to receive a customer contact to request service; a service completion objective module configured to determine a service completion objective for the customer contact based upon a service-level agreement; a handling time module configured to determine a handling time limit based on a historical elapsed handling time; and a processor configured to subtract the handling time limit from the service completion objective, to produce the service agent start time.

In some embodiments, the service completion objective module is further configured to determine a service completion objective for the customer contact based upon a characteristic of the customer contact.

In some embodiments, the service completion objective module further includes a database configured: to store a pre-calculated service completion objective that is based upon one or more of contact type, identity of end-customer and repeat contact status, and to return the pre-calculated service completion objective as the service completion objective.

In some embodiments, the system further includes a delivery module configured to deliver the customer contact to the service agent within a predetermined time period before the service agent start time.

In some embodiments, the system further includes a scheduling module configured to prohibit a reschedule of the service agent start time by the service agent.

In some embodiments, the system further includes an alerting module configured to alert the service agent of a service completion objective deadline within a predetermined time period before the deadline.

In some embodiments, the system further includes an assignment module configured to suspend assignment of new service contacts to the service agent within a predetermined time period before a service completion objective deadline.

In some embodiments, the system further includes an updating module configured to update a database of historical elapsed handling times after the service agent has completed service.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

DETAILED DESCRIPTION

Embodiments of the present invention generally relate to a system and method to more effectively schedule a service agent start time for a desired service completion objective. More specifically, embodiments of the present invention relate to a system and method for substantially meeting a response time specified in a service level agreement (SLA).

Although described in the context of a contact center, it is to be understood that this system and method is contemplated and within the scope of embodiments of the present invention to be applied to any system and method where agents, and more particularly service agents, are called upon to assist multiple customers at any given time, either simultaneously or substantially simultaneously.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

Figure 1:
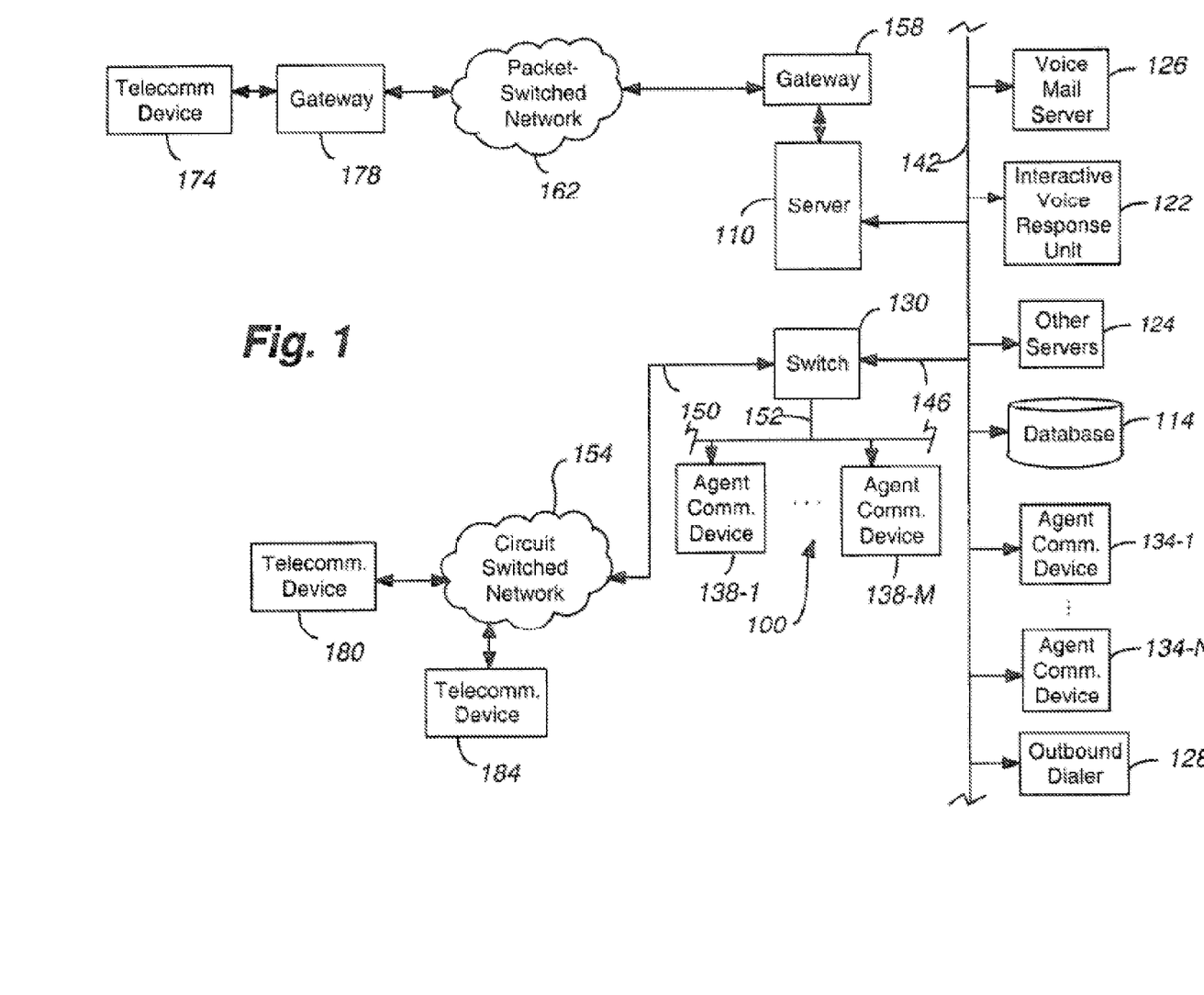
FIG. 1 is a block diagram depicting a contact center in accordance with an embodiment of the present invention.

Referring now to FIG. 1, which is a block diagram depicting a contact center in accordance with an embodiment of the present invention, there is provided a contact center 100. The contact center generally comprises a central server 110, a set of data stores or databases 114 containing contact or customer related information and other information that can enhance the value and efficiency of the contact, and a plurality of servers, for example, a voice mail server 126, an Interactive Voice Response unit or "IVR" 122, and other servers 124, an outbound dialer 128, a switch 130, a plurality of working agents operating packet-switched (first) telecommunication devices 134-1 to N (such as, but not limited to, computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The gateway 158 may comprise Avaya Inc.'s, G250™, G350™, G430™, G450™, G650™, G700™, and IG550™ Media Gateways and may be implemented as hardware such as, but not limited to, via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones, such as Avaya Inc.'s, IP Softphone™; Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

The packet-switched network 162 of FIG. 1 may comprise any data and/or distributed processing network such as, but not limited to, the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and can include interfaces for various other protocols such as, but not limited to, the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user telecommunication devices, and other elements as shown in FIG. 1 is for purposes of illustration only and should not be construed as limiting embodiments of the present invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource such as, but not limited to, the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

The contact center 100, in one configuration, includes an automated instant messaging server as another server 124. In such an embodiment, when a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC) address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2:
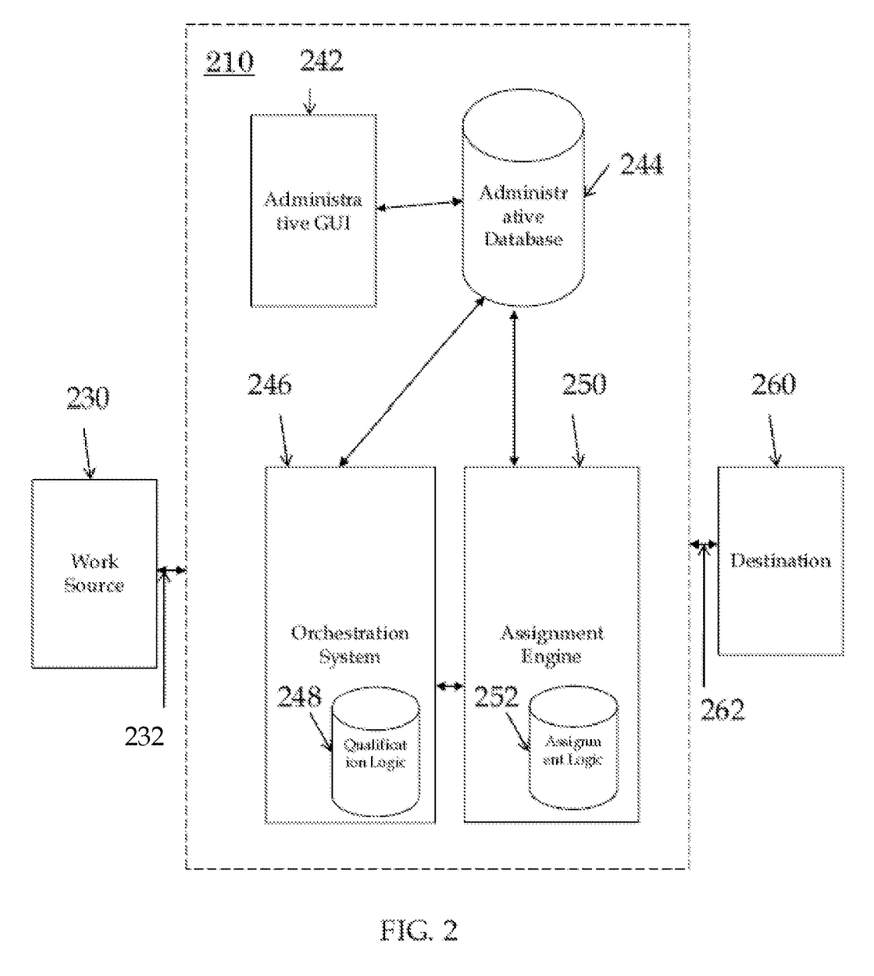
FIG. 2 is a system level block diagram depicting an administrator server in accordance with an embodiment of the present invention.

Referring to FIG. 2, which depicts a block diagram of a server 210 in accordance with an embodiment of the present invention, there is provided a server 210 in communication with a work source 230, which may comprise customer or any other entity capable of originating a transmission of work or a contact. The server 210 may be configured in communication with the work source 230 generally via a work source communication means 232, which may comprise any means of communicating data, for example, one or more trunks, phone lines, wireless connections, Bluetooth connections, digital connections, analog connection, combinations thereof, and the like.

In some embodiments of the present invention, the server 210 may also be in communication with a destination 260, which may comprise an agent or any entity capable of receiving a transmission of work or a contact. The server 210 may be configured in communication with the destination 260 generally via an agent communication means 262, which may comprise any means of communicating data, for example, a voice-and-data transmission line such as LAN and/or a circuit switched voice line, wireless connections, Bluetooth connections, digital connections, analog connections, combinations thereof, and the like. The server 210 may comprise any type of computer server, for example, a Basic Call Management System ("BCMS") and a Call Management System ("CMS") capable of segmenting work.

The server 210 can be any architecture for directing contacts to one or more telecommunication devices. Illustratively, the server may be a modified in the form of Avaya Inc.'s Definity™ Private-Branch Exchange (PBX)-based ACD system; MultiVantage™ PBX, CRM Central 2000 Server™, Communication Manager™, Business Advocate™, Call Center™, Contact Center Express™, Interaction Center™, and/or S8300™, S8400™, S8500™, and S8700™ servers; or Nortel's Business Communications Manager Intelligent Contact Center™, Contact Center—Express™, Contact Center Manager Server™, Contact Center Portfolio™, and Messaging 100/150 Basic Contact Center™.

In many embodiments, the server 210 may be a stored-program-controlled system that conventionally includes, for example, interfaces to external communication links, a communications switching fabric, service circuits (e.g., tone generators, announcement circuits, and the like.), memory for storing control programs and data, and a processor (i.e., a computer) for executing the stored control programs to control the interfaces and the fabric and to provide automatic contact-distribution functionality. The server 210 generally may include a network interface card (not shown) to provide services to the serviced telecommunication devices.

The server 210 may be configured for segmenting work in the contact center and may comprise an administrative database 244 configured to store at least a common skill option and a service skill option; an administrative graphical user interface ("GUI") 242 for accessing at least the administrative database 244 and configuring the common skill option and the service skill option; an orchestration system 246 configured to receive a contact from a work source 230 and orchestrate the contact according to a qualification logic stored in a qualification logic database 248; and an assignment engine 250 configured to receive the contact, the common skill option, and the service skill option, and segment the contact according to an assignment logic stored in an assignment logic database 252. In accordance with some embodiments of the present invention, the qualification logic stored in the qualification logic database 248 and the assignment logic stored in the assignment logic database 252 may comprise any logical set of steps or sequences configured to process data at the call center in accordance with any embodiment of the present invention.

The server and/or switch can be a software-controlled system including a processing unit (CPU), microprocessor, or other type of digital data processor executing software or an Application-Specific Integrated Circuit (ASIC) as well as various portions or combinations of such elements.

Figure 3:
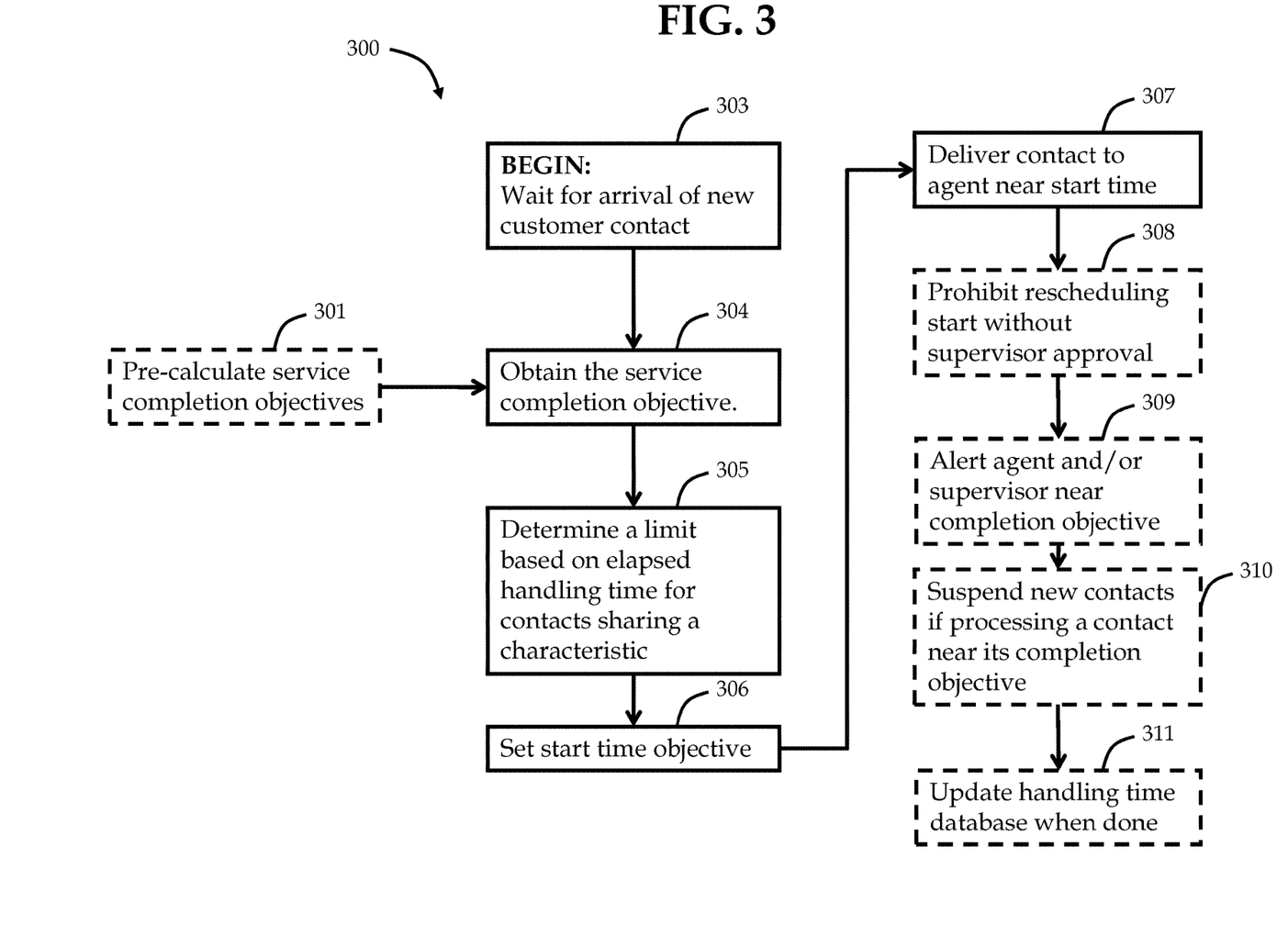
FIG. 3 is a flow chart depicting a method of routing in a contact center based on service completion objective, in accordance with an embodiment of the present invention.

FIG. 3 illustrates a process 300 at a high level of abstraction in accordance with an embodiment of the present invention. Optional steps of the process are illustrated using dashed lines. In advance, at optional step 301, service completion objectives may be pre-calculated based on a characteristic of the contact such as, but not limited to, the type of contact, identity of the end-customer, repeat contact status, nature of the problem, criticality of the problem, etc. Real time contacts would normally have a traditional start time objective. However, in some cases they might also have completion objectives in order to manage alerts to the agent or supervisor. Repeat contact status refers to whether the customer has previously contacted the contact center, for instance, about this problem or any problem. Repeat contact status would typically be about this problem and also within a period of time, such as, by way of example only, within the last 48 hours. The service completion objective sets a time limit objective for the time interval between the arrival of a customer contact and a resolution of the reason for the customer contact. The service completion objectives, if pre-calculated, are stored in a memory until needed. Alternatively, the service completion objectives may be calculated at the time they are needed in order to respond to a customer contact. Alternatively, the service completion objectives may be administered targets, i.e., administratively set, reviewed, modified, and so forth. Real time contacts usually have a traditional start time objective. However, alternatively, real time contacts may also have completion objectives in order to manage alerts to the agent or supervisor.

Process 300 begins at step 303 when process 300 waits for the arrival of a new customer contact. Step 303 may be implemented by a variety of methods such as, but not limited to, a daemon process running in the background, or an interrupt-driven process, etc.

When a new customer contact arrives, control of process 300 transitions to step 304, at which the service completion objective for this customer contact is determined. If the service completion objective was pre-calculated during step 301, then the objective is retrieved from memory storage. If the service completion objective was not pre-calculated during step 301, then it is calculated in step 304 based on a characteristic of the contact such as, but not limited to, contact type, identity of the end-customer, repeat contact status, nature of the problem, criticality of the problem, etc.

Next, control of process 300 transfers to step 305, at which a scaled handling time objective for the present customer contact is calculated as a predetermined percentile of historical elapsed handling times for service contacts sharing one or more characteristics with the present customer contact. For instance, the shared characteristic(s) may include one or more of contact type, identity of the end-customer, repeat contact status, nature of the problem, criticality of the problem, etc. If there are no exact historical matches, a weighted match of partial matches maybe used. If there is insufficient historical elapsed handle time, embodiments of the present invention may use a target elapsed handle time for work of this type. The historical elapsed handling times are maintained in a database by the system. There is an option for allowing users to administer "expected average handling time" for a skill/contact type. This is used within algorithms when no history exists. This administered field could also be used for this purpose. The percentile of historical elapsed handling time used may be based on the urgency and any penalty for not fulfilling a service time commitment. Critical work may use close to 100% of the longest historical elapsed handling time, while non-critical work may use the median historical elapsed handling time. For real-time contacts, it is common to have a percentage service level (% SL) objective. For example 80% within a service start objective of 30 seconds. Similar percentage level objectives would be desirable for contact types with service completion objectives.

For example, an email skill might have a % SL objective of 80% completed within 1 hour. In order to successfully meet this % goal, at least a percentile of 80% or greater for handling times needs to be chosen. So an acceptable setting would be a handling time percentile, which is a slightly higher than the % SL objective. For example: if 80% completed within 1 hour, then handling time percentile should be in the range 80-90%. A high percentile would tend to make the start time start earlier and this may often provide significantly more time than the service agent needs for responding to the service contact, thereby creating conditions like the conditions that the embodiments of the present invention seek to avoid. A low percentile would tend to make the start time start later and may often cause the service agent to miss the service completion objective time. To meet these competing considerations, the predetermined percentile may be set at a point within the range of about the 70th percentile to about the 90th percentile, in order to produce the scaled handling time objective (i.e., the handling time objective for this customer contact will be adequate to have handled about 70% to about 90% of the previous service contacts of this type as recorded from the historical data in the memory).

Next, control of process 300 transfers to step 306, at which a start time objective for the present customer contact is determined by subtracting the scaled handling time objective, as determined in step 305, from the pre-assigned service completion objective obtained in step 304.

Next, control of process 300 transfers to step 307, at which process 300 delivers the customer contact to an agent at a time based on meeting the start time objective. Typically, the customer contact will be delivered shortly before the start time objective calculated in step 306. Delivery time may further depend on the agent's workload or idle time. For instance, if the workload or idle time is within a normal range, then first select those work request(s) that are within about 30 minutes of its start time objective. Then select the work request(s) that are furthest along in exceeding its start time objective. If the agent's workload is low or idle time is high, then select the work request that is furthest along in exceeding its start time objective (i.e., most behind schedule). If the agent's workload is high or idle time is low, then deliver only work that is in jeopardy of exceeding its start time objective. If there is no pending work request then let the agent sit idle. By delaying the delivery of the customer contact to the agent in this way, the agent will ordinarily need to work more efficiently and diligently in order to meet the service completion objective obtained in step 304. One means of performing this is called Service Objective (SO). Contacts have different service objectives (start time objectives) in different skills. If an agent with multiple skills becomes available, the SO feature chooses the contact with the highest "wait time/service objective" ratio. In an embodiment, the same rules would be applied here. Since there may be a mix of real-time and non-real-time skills involved, in an embodiment, the system could use the start time objectives for each to compute the ratios.

Next, control of process 300 transfers to optional step 308, at which the agent is prohibited from rescheduling (i.e., prohibited from delaying) the start of handling the contact past the service completion objective minus a predetermined duration without supervisor approval. Otherwise, by rescheduling, an agent may be able to delay further work on handling the contact until a later time, with a reminder at that time, but with sufficient remaining time then to complete handling the contact given the service completion objective and the predicted handling time. Any work already expended by the agent would be subtracted from the predicted handling time. For instance, the predetermined duration may be the average handling time, or the median handling time (e.g., 50th percentile), etc. This provides a delay in starting the work on the service contact, but at the cost of less time to meet the service completion objective and a concomitant increase in a risk of missing the service completion objective. In alternative embodiments, this predetermined threshold may be calculated by tracking how much handling time has already been incurred for this customer contact.

Next, control of process 300 transfers to optional step 309, at which process 300 monitors the progress of the service agent, and (if not already completed) step 309 may provide an alert to the service agent when the customer contact is nearing its completion objective. In an alternative embodiment, the time for providing an alert may be adjusted depending on a focus status of the customer contact—that is, whether the present customer contact is currently "in focus" (i.e., the customer contact is being actively worked on), or whether the customer contact is currently not currently in focus (i.e., is on hold). Ordinarily, an earlier alert may be provided if the present customer contact is not in focus. Optionally, a supervisor may be alerted if the contact is on hold and is nearing its service completion objective.

Next, if necessary, control of process 300 transfers to optional step 310, at which an agent is prohibited from being assigned a new real-time contact (e.g., telephone call, instant message, or web chat, etc.) if the agent is already processing a customer contact that is near its service completion objective. The purpose is to allow the service agent to concentrate on servicing and finishing up an already-assigned customer contact.

Once the service agent has completed handling the customer contact, control of process 300 transfers to optional step 311, at which the database of handling times is updated to incorporate the handling time of the present service contact.

Embodiments of the present invention include a system having one or more processing units coupled to one or more memories. The one or more memories may be configured to store software that, when executed by the one or more processing unit, schedules a start time objective of a service agent for a work assignment having a service completion objective, by use of process 300.

An optional embodiment of the present invention provides a dynamic adjustment of the methods described herein in order to better meet service completion objectives. For instance, for the present values or settings for start times, handling times, and so forth, the system may monitor a success rate in achieving service completion objectives. In order to more closely or consistently meet service objectives, the system may adjust its derivation of start times from completion times. For example, if the percent Service Completion Objective is 80% in 1 hour, and the system is achieving only 75%, then the system may automatically adjust the process to allow longer handling times, by scheduling earlier start times, thereby providing an improved success rate for the percent Service Completion Objective.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term one or similar language is used. Further, the terms any of followed by a listing of a plurality of items and/or a plurality of categories of items, as used herein, are intended to include "any of," "any combination of," "any multiple of," and/or any combination of multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

What is claimed is:

1. A method to schedule a service agent start time for a customer contact with a contact center, comprising:

receiving, via a communication channel to the contact center, a customer contact from a first telecommunication device to request service;

determining, by a contact center computer, a service completion objective for the customer contact based upon a predetermined percentage service level objective and a characteristic of the customer contact from the first telecommunication device;

calculating and storing, by the contact center computer, the service completion objective in a memory;

determining, by the contact center computer, a handling time limit based on historical elapsed handling times;

subtracting, by the contact center computer, the handling time limit from the service completion objective, to produce the service agent start time;

monitoring, by the contact center computer, success rates in achieving service completion objectives;

dynamically modifying, by the contact center computer, the service agent start time in response to the monitored success rates;

dynamically routing, by the contact center computer, the customer contact from the first telecommunication device to a second telecommunication device associated with a service agent within a predetermined time period before the service agent start time, wherein the service completion objective comprises a time objective to complete tasks between an arrival of the customer contact and a resolution of a reason for the customer contact, the tasks comprising:

receiving the customer contact from the first telecommunication device;

dynamically routing the customer contact from the first telecommunication device to the second telecommunication device associated with the service agent based on meeting the service agent start time and dependent on a workload and skills of the service agent;

waiting for the service agent to handle the customer contact; and handling the customer contact by the service agent, in order to resolve the reason for the customer contact; and prohibiting, by the contact center computer, a reschedule of the customer contact by the service agent to a time later than the service completion objective minus a predicted handling time plus an amount of time already expended on the customer contact, wherein a likelihood of meeting the service completion objective does not fall below a predetermined objective.

2. The method of claim 1, wherein the step of determining a service completion objective further comprises:

storing into a database a pre-calculated service completion objective that is based upon one or more of contact type, identity of end-customer and repeat contact status; or retrieving from the database the pre-calculated service completion objective as the service completion objective.

3. The method of claim 1, wherein the service completion objective comprises an administered target.

4. The method of claim 1, wherein the handling time limit comprises a time indicated by a predetermined percentile of an historical elapsed handling time.

5. The method of claim 1, wherein the customer contact from the first telecommunication device dynamically routed to second telecommunication device associated with the service agent comprises a customer contact that has exceeded its start time objective by a greatest amount of time as compared with other pending customer contacts received by the contact center.

6. The method of claim 1, further comprising:
alerting, by the contact center computer, the service agent of a service completion objective deadline within a predetermined time period before the deadline.

7. The method of claim 6, wherein the predetermined time period depends upon a focus status of the customer contact.

8. The method of claim 1, further comprising:
suspending, by the contact center computer, assignment of new service contacts to the service agent within a predetermined time period before a service completion objective deadline.

9. The method of claim 1, further comprising:
updating, by the contact center computer, a database of historical elapsed handling times after the service agent has completed handling the customer contact in order to resolve the reason for the customer contact.

10. A system to schedule a service agent start time for a customer contact, comprising:
a first telecommunication device;
a second telecommunication device; and
a memory storing instructions executable by a processor;
the processor, in communication with the memory and the communication channel, wherein when the processor executes the instructions, the processor:
receives a customer contact to request service from the first telecommunication device;
determines a service completion objective for the customer contact based upon a predetermined percentage service level objective and a characteristic of the customer contact;
calculates the service completion objective;
stores the service completion objective;
determines a handling time limit based on historical elapsed handling times;
subtracts the handling time limit from the service completion objective, to produce the service agent start time;
monitors success rates in achieving service completion objectives; and
dynamically modifies the service agent start time in response to the monitored success rates;
dynamically routes the customer contact from the first telecommunication device to the second communication device associated with a service agent within a predetermined time period before the service agent start time,
wherein the service completion objective comprises a time objective to complete tasks between an arrival of the customer contact and a resolution of a reason for the customer contact, the tasks comprising:
receiving the customer contact from the first telecommunication device;
dynamically routing the customer contact from the first telecommunication device to the second telecommunication device associated with the service agent based on meeting the service agent start time and dependent on the workload and skills of the service agent;
waiting for the service agent to handle the customer contact; and
handling the customer contact by the service agent, in order to resolve the reason for the customer contact; and
prohibits rescheduling of the customer contact by the service agent to a time later than the service completion objective minus a predicted handling time plus an amount of time already expended on the customer contact, wherein meeting the service completion objective does not fall below a predetermined objective.

11. The system of claim 10, wherein when the processor executes the instructions, the processor:
stores a pre-calculated service completion objective that is based upon one or more of contact type, identity of end-customer and repeat contact status; and
returns the pre-calculated service completion objective as the service completion objective.

12. The system of claim 10, wherein the service completion objective comprises an administered target.

13. The system of claim 10, wherein the customer contact dynamically routed to the service agent comprises a customer contact that has exceeded its start time objective by a greatest amount of time as compared with other pending customer contacts received by the contact center.

14. The system of claim 10, wherein when the processor executes the instructions, the processor:
alerts the service agent of a service completion objective deadline within a predetermined time period before the deadline.

15. The system of claim 10, wherein when the processor executes the instructions, the processor:
suspends assignment of new service contacts to the service agent within a predetermined time period before a service completion objective deadline.

16. The system of claim 10, wherein when the processor executes the instructions, the processor:
updates a database of historical elapsed handling times after the service agent has completed handling the customer contact in order to resolve the reason for the customer contact.

* * * * *